United States Patent [19]

Segawa et al.

[11] Patent Number: 4,981,503
[45] Date of Patent: Jan. 1, 1991

[54] HIGH-HARDNESS SILICA GLASS AND METHOD OF PRODUCING THE SAME

[75] Inventors: Hideaki Segawa, Yokohama; Keiichiro Nishizawa, Sagamihara; Shinichi Kondo, Yokohama, all of Japan

[73] Assignee: Tosoh Corporation, Shinnanyo, Japan

[21] Appl. No.: 488,448

[22] Filed: Feb. 27, 1990

Related U.S. Application Data

[63] Continuation of Ser. No. 183,085, Apr. 19, 1988, abandoned.

[51] Int. Cl.$^5$ .................. C03B 11/00; C03C 23/00; C03C 17/22
[52] U.S. Cl. .................. 65/30.1; 65/32.4; 65/60.6; 65/60.7; 264/1.2
[58] Field of Search .............. 65/30.1, 32.4, 24, 60.53, 65/60.6, 60.7, 18.1, 18.3, 60.8; 264/1.2, 56, 65, 570

[56] References Cited

U.S. PATENT DOCUMENTS

| | | | |
|---|---|---|---|
| 1,949,898 | 3/1934 | Cochrane | 65/58 |
| 2,086,185 | 7/1937 | Keaney | 65/58 |
| 2,094,287 | 9/1937 | Zimmerman | 65/58 |
| 3,465,074 | 9/1969 | Neuroth | 264/1.2 |
| 3,717,498 | 2/1973 | Franz | 65/32.4 |
| 3,909,991 | 10/1975 | Coes | 65/18.3 |
| 4,116,657 | 9/1978 | Elmer | 65/32.4 |
| 4,381,931 | 5/1983 | Hunold | 65/18.1 |
| 4,501,601 | 2/1985 | Haupt | 65/18.4 |
| 4,620,862 | 11/1986 | Dorn | 65/18.1 |
| 4,643,858 | 2/1987 | Mizutani | 264/65 |
| 4,657,877 | 4/1987 | Becher | 264/65 |
| 4,661,136 | 4/1987 | Dorn | 65/18.1 |

FOREIGN PATENT DOCUMENTS 2049731 4/1972 Fed. Rep. of Germany .
61-97147 5/1986 Japan .

OTHER PUBLICATIONS

Condensed Chemical Dictionary, p. 730, 10th Ed., 1981; Van Nostrand Reinhold Company, N.Y.; Gessner G. Hawley.
Hackh's Chemical Dictionary, 4th Ed.; Grant, J.; McGraw-Hill Book Co.; pp. 576–577.
"Glass Science", by Robert H. Doremus; John Wiley & Sons, New York, U.S.; pp. 283–285, 310–311.
"Chemical Abstracts", vol. 105, No. 20, Nov. 1986, p. 306, Abstract No. 177312r, Columbus, Ohio, U.S.; JP-A-61 97 147 (Seiko Epson K.K.) 15-05-1986 (Abstract).

Primary Examiner—Kenneth M. Schor
Attorney, Agent, or Firm—Oblon, Spivak, McClelland, Maier & Neustadt

[57] ABSTRACT

High-hardness silica glass having transparency substantially on the same level as silica glass and a Vickers hardness of 12–20 GPa is produced by covering silica glass with powder and treating the silica glass at a temperature of 1400°–2500° C. and a pressure of 10–300 MPa in an atmosphere of an inert gas or a nitrogen gas.

11 Claims, 1 Drawing Sheet

HIGH-HARDNESS SILICA GLASS AND METHOD OF PRODUCING THE SAME

This application is a continuation of application Ser. No. 07/183,985, filed Apr. 19, 1988, now abandoned.

BACKGROUND OF THE INVENTION

The present invention relates to a high-hardness silica glass and a method of producing it, and more particularly to high-hardness silica glass as transparent as usual silica glass and having a Vickers hardness of 12-20 GPa useful for optical parts such as optical elements, optical communication elements, etc., structural materials such as fibrous materials added to composite materials, and window glasses for watches, aircrafts, autoclaves and other high-pressure containers.

Pure silica glass is highly excellent in transmittancy and also has a relatively high hardness (Vickers hardness of 5.8-6.9 GPa). The addition of some additives to further increase its hardness, however, usually leads to the deterioration of transmittancy thereof.

Other types of glass provided with improved hardness are reportedly crystallized glass, oxinitride glass, chemically reinforced glass, etc. Among them, what has the highest hardness is the oxinitride glass which contains nitrogen in the glass structure to increase its hardness. Why the glass is provided with higher hardness by introducing nitrogen into the glass structure is not necessarily clear, but it may be presumed that the formation of Si—N bonds in the glass structure makes the glass denser.

The oxinitride glass may be produced by various methods as shown below:

(1) Blowing an $NH_3$ gas into a molten glass heated at high temperatures.

(2) Treating porous glass with an $NH_3$ gas at high temperatures.

(3) Using a nitride starting material and melting it at high temperatures.

(4) Using a nitride starting material and melting it at high temperatures and pressure.

Actually, however, any of the above methods can hardly provide glass having excellent transmittancy. Some types of oxinitride glass having high transmittancy and hardness which have been reported so far are shown in Table 1.

TABLE 1

| Composition | N(at %) | Vickers Hardness (GPa) |
|---|---|---|
| Y-Al-Si-O-N | 5 | 11.67 |
| La-Si-O-N | 18 | 11.96 |

As shown in Table 1, considerable improvement in hardness has been achieved, but further improvement in hardness is desired for glass used in severe applications. In addition, strong demand exists to provide a method of easily producing glass having high transmittancy and hardness.

OBJECT AND SUMMARY OF THE INVENTION

Therefore, an object of the present invention is to provide glass having excellent transmittancy and hardness without suffering from the above problems.

Another object of the present invention is to provide a method of producing such glass.

As a result of intense research in view of the above objects, the inventors have found that glass with high hardness and transmittancy can be obtained by treating silica glass surrounded by carbon or nitride powder at high temperatures and pressure.

Thus, the high-hardness silica glass according to the present invention has transparency substantially on the same level as silica glass and a Vickers hardness of 12-20 GPa.

The method of producing a high-hardness silica glass according to the present invention comprises covering silica glass with powder and treating the silica glass at a temperature of 1400°-2500° C. and pressure of 10-300 MPa in an atmosphere of an inert gas or a nitrogen gas.

DETAILED DESCRIPTION OF THE INVENTION

Figure 1:
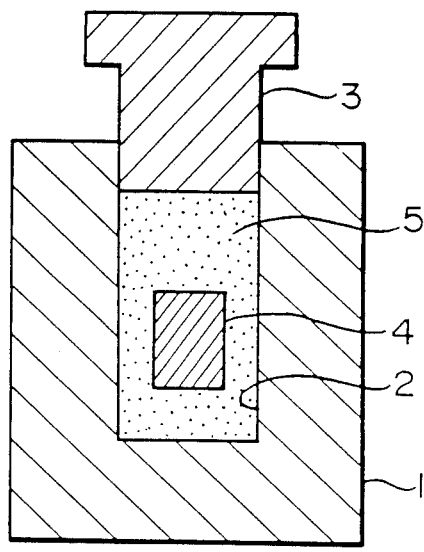
FIG. 1 is a schematic cross-sectional view showing a hot press apparatus for producing high-hardness silica glass according to the present invention.

In order to provide high-hardness silica glass having transparency substantially on the same level as silica glass and a Vickers hardness of 12-20 GPa, a block of silica glass inherently having relatively high hardness is used as a starting material, and it is surrounded by powder composed of at least one component selected from carbon and nitrides such as silicon nitride and boron nitride, and treated at a temperature of 1400°-2500° C. and pressure of 10-300 MPa.

The silica glass usable in the present invention is not restricted in a production method, a shape and a size. However, from the aspect of easiness of handling, it is preferable that the silica glass is in advance formed substantially in the same shape and size as those of a final product which is usually as big as 20 cm or so. For instance, the silica glass of 10 mm in thickness itself has as high transmittance as 92% or more when measured with a wavelength of 200-2000 mm.

It is extremely important that the silica glass is surrounded by powder when it is treated at high temperatures and pressure. The above powder is preferably made of carbon or nitride compounds such as silicon nitride, boron nitride, etc. These kinds of powder may be used alone or in combination. The existence of the powder around the silica glass makes it possible to produce high-hardness silica glass while retaining its initial shape completely, because the powder surrounding the silica glass serves to prevent the silica glass from being deformed by flowing even when it becomes flowable at high treatment temperatures.

The powder used in the present invention preferably has a particle size of about 50 $\mu$m-5 mm. When it is smaller than 50 $\mu$m, the powder is sintered too strongly, making it difficult to remove the treated silica glass. On the other hand, when it is larger than 5 mm, it is difficult to keep the initial shape of the silica glass which becomes flowable by a high-temperature treatment. When the powder has a particle size in the range of about 50 $\mu$m-5 mm, it is partially sintered, which is desirable not only for keeping the shape of the silica glass being treated but also for ensuring the easy removal of the completed high-hardness silica glass.

The silica glass surrounded by the above powder is treated at a temperature of 1400°-2500° C. and pressure of 10-300 MPa. The treatment temperature should be 1400° C. or higher to provide the silica glass being treated with fluidity, but when it exceeds 2500° C., SiO2 tends to sublimate vigorously. The preferred temperature is 1500°-2000° C. With respect to the treatment pressure, it may vary depending upon the size of the silica glass block being treated, but it should be 10 MPa or more so that compression stress remains in the resulting silica glass. However, when the pressure exeeds 300 MPa, the powder surrounding the silica glass is strongly sintered, making difficult the removal of the resulting high-hardness silica glass. Therefore, it should be 10-300 MPa. The preferred treatment pressure is 150-200 MPa.

The production of high-hardness silica glass under the above-mentioned conditions may be carried out by hot pressing or hot isostatic pressing.

Referring to FIG. 1, a hot press apparatus comprises a lower die 1 having a cavity 2 and an upper die 3 made of carbon and slidably received in the cavity 2. The silica glass 4 formed in the shape of a final product is placed in the cavity 2 while being embedded in the powder 5. In a state that the silica glass 4 is surrounded by the powder 5, the upper die 3 is lowered to press the silica glass 4 together with the powder 5 while heating them in an atmosphere of an inert gas or a nitrogen gas.

Figure 2:
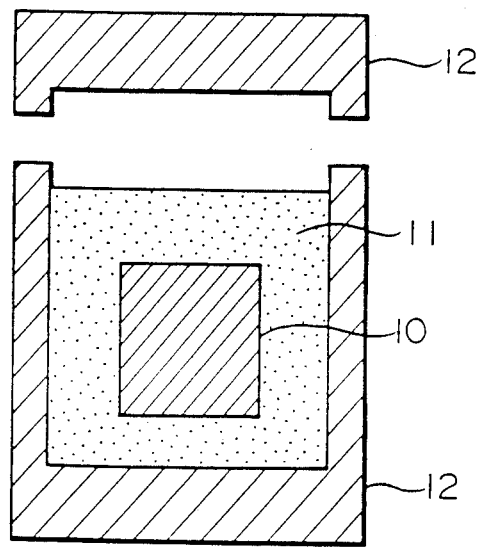
FIG. 2 is a schematic cross-sectional view showing a crucible for hot isostatic press for producing high-hardness silica glass according to the present invention.

If the silica glass is subjected to hot isostatic pressing (HIP), it is contained in a carbon crucible as shown in FIG. 2. Specifically, the silica glass 10 is embedded in the powder 11 contained in the carbon crucible 12, and the carbon crucible 12 is placed in a hot isostatic press apparatus (not shown). The treatment conditions in HIP are essentially the same as in hot pressing.

Incidentally, in the case of hot pressing, the silica glass can be treated as if it is subjected to HIP; in other words, so-called pseudo-HIP effects can be obtained, because the die is filled with the powder surrounding the silica glass. And when the treatment is carried out at temperatures of 1700° C. or higher under high pressure, HIP is more preferable than hot pressing because the powder tends to be strongly sintered in hot pressing. In the case of HIP, the filled powder is scarcely sintered, so that it is extremely easy to remove the resulting high-hardness silica glass.

The reasons why high-hardness silica glass having excellent transmittancy can be produced according to the present invention are considered as follows: By using a silica glass block inherently having relatively high transmittancy as a starting material, surrounding it with at least one kind of powder selected from carbon powder and nitride powder made of silicon nitride or boron nitride and treating it in an atmosphere of an inert gas or a nitrogen gas at a temperature of 1400°-2500° C. and pressure of 10-300 MPa, (a) Compression stress remains in the silica glass, thereby increasing the hardness of the silica glass:
(b) A nitrogen gas is diffused into the silica glass, thereby forming a structure similar to oxinitride having Si—N bonds so that the hardness is increased:
(c) Part of nitride powder is diffused into the silica glass, thereby forming a structure similar to oxinitride having Si—N bonds: so that the hardness is increased;
(d) Carbon powder serves to reduce the oxygen in Si—O bonds of the silica glass, which is then substituted by nitrogen in the N2 atmosphere, thereby forming a structure similar to oxinitride having Si—N bonds so that the hardness is increased: and
(e) The synergistic effects of an nitrogen gas and nitride powder serve to form a structure similar to oxinitride having Si—N bonds, thereby increasing the hardness.

Because the compression stress remaining in the silica glass is not so large and because the similar structure to oxinitride is introduced in an extremely small proportion, they do not substantially affect the transmittancy of the silica glass. Therefore, the treated silica glass has an increased hardness while retaining excellent transmittancy inherently possessed by the starting silica glass.

Incidentally, since some compression stress remains in the high-hardness silica glass having excellent transmittancy which is produced according to the prevent invention, the high-hardness silica glass has relatively poor machinability, and also accurate measurement of hardness is difficult due to the fact that cracking tends to take place in the course of measuring hardness. This problem can be solved by a heat treatment which is usually applied to silica glass; such a heat treatment can provide the high-hardness silica glass of the present invention with good machinability while retaining high hardness. It should be noted however, that this heat treatment is not indispensable and that it may be omitted if the silica glass is in advance formed in the shape of a final product.

The present invention will be explained in further detail by means of the following Examples without intention of restricting the scope of the present invention.

EXAMPLE 1

A silica glass block of 70 mm in diameter and 70 mm in height was placed in the cavity of a hot press die shown in FIG. 1, with BN powder of 50-100 μm in particle size surrounding the silica glass block. The hot pressing was conducted at various temperatures shown in Table 2 below under pressure of 10 MPa for 1 hour. Incidentally, temperature increase and decrease in the hot pressing were conducted at a rate of 200° C./hr. The resulting silica glass thus treated was heat-treated in the atmosphere at 1150° C. for 1 hour, and its Vickers hardness was measured by a Vickers hardness tester under a load of 25 g according to JIS Z 2224.

TABLE 2

| Temp. (°C.) | Hardness (GPa) | Powder | Atmosphere |
|---|---|---|---|
| —* | 6.88 | — | — |
| 1500 | 12.36 | BN | Argon |
| 1600 | 12.67 | BN | Argon |
| 1700 | 12.85 | BN | Argon |

Note:* No hot pressing

All of the resulting silica glass specimens permitted a light of 0.16-4.8 μm in wavelength to pass therethrough substantially in the same transmittance as that of usual silica glass.

EXAMPLE 2

A cubic silica glass block of 200 mm in each side was placed in the cavity of a carbon crucible for HIP as shown in FIG. 2 with Si3N4 powder of 0.1-0.5 mm in particle size surrounding the glass block. The HIP treatment was conducted under various temperature and pressure conditions for 1 hour. Incidentally, temperature increase an decrease in HIP were at a rate of 200° C./hr. Each of the resulting silica glass was heat-treated at 1150° C. for 1 hour in the atmosphere. Hardness was measured on each silica glass by a Vickers hardness tester under a load of 25 g. The results are shown in Table 3.

TABLE 3

| Temp. (°C.) | Pressure (MPa) | Hardness (GPa) | Powder | Atmosphere |
|---|---|---|---|---|
| 1500 | 120 | 12.47 | $Si_3N_4$ | Argon |
| " | 180 | 12.65 | $Si_3N_4$ | Argon |
| 1700 | 120 | 13.44 | $Si_3N_4$ | Argon |
| " | 180 | 13.73 | $Si_3N_4$ | Argon |
| 1900 | 120 | 13.94 | $Si_3N_4$ | Argon |
| " | 180 | 14.31 | $Si_3N_4$ | Argon |

All of the above silica glass specimens permitted a light of 0.16–4.8 μm in wavelength to pass therethrough substantially in the same transmittance as that of usual silica glass.

EXAMPLE 3

A silica glass block of 70 mm in diameter and 70 mm in height was placed in the cavity of a hot press die shown in FIG. 1, with carbon powder of 50–100 μm in particle size surrounding the silica glass block. The hot pressing was conducted at various temperatures shown in Table 4 below under pressure of 10 MPa for 1 hour. Incidentally, temperature increase and decrease in the hot pressing were at a rate of 200° C./hr. The resulting silica glass thus treated was heat-treated in the atmosphere at 1150° C. for 1 hour, and its Vickers hardness was measured by a Vickers hardness tester under a load of 25 g.

TABLE 4

| Temp. (°C.) | Hardness (GPa) | Powder | Atmosphere |
|---|---|---|---|
| 1500 | 15.31 | Carbon | Nitrogen |
| 1600 | 15.47 | Carbon | Nitrogen |
| 1700 | 15.63 | Carbon | Nitrogen |

All of the resulting silica glass specimens permitted a light of 0.16–4.8 μm in wavelength to pass therethrough substantially in the same transmittance as that of usual silica glass.

EXAMPLE 4

A cubic silica glass block of 200 mm in each side was placed in the cavity of a carbon crucible for HIP as shown in FIG. 2 with carbon powder of 0.1–0.5 mm in particle size surrounding the glass block. The HIP treatment was conducted under various temperature and pressure conditions for 1 hour. Incidentally, temperature increase an decrease in HIP were at a rate of 200° C./hr. Each of the resulting silica glass was heat-treated at 1150° C. for 1 hour in the atmosphere. Hardness was measured on each silica glass by a Vickers hardness tester under a load of 25 g. The results are shown in Table 5.

TABLE 5

| Temp. (°C.) | Pressure (MPa) | Hardness (GPa) | Powder | Atmosphere |
|---|---|---|---|---|
| 1500 | 120 | 15.57 | Carbon | Nitrogen |
| " | 180 | 15.72 | Carbon | Nitrogen |
| 1700 | 120 | 16.03 | Carbon | Nitrogen |
| " | 180 | 16.48 | Carbon | Nitrogen |
| 1900 | 120 | 16.88 | Carbon | Nitrogen |
| " | 180 | 17.12 | Carbon | Nitrogen |

All of the above silica glass specimens permitted a light of 0.16–4.8 μm in wavelength to pass therethrough substantially in the same transmittance as that of usual silica glass.

EXAMPLE 5

A silica glass block of 70 mm in diameter and 70 mm in height was placed in the cavity of a hot press die shown in FIG. 1, with BN powder of 50–100 μm in particle size surrounding the silica glass block. The hot pressing was conducted at various temperatures shown in Table 6 below under pressure of 10 MPa for 1 hour. Incidentally, temperature increase and decrease in the hot pressing were at a rate of 200° C./hr. The resulting silica glass thus treated was heat-treated in the atmosphere at 1150° C. for 1 hour, and its Vickers hardness was measured by a Vickers hardness tester under a load of 25 g.

TABLE 6

| Temp. (°C.) | Hardness (Gpa) | Powder | Atmosphere |
|---|---|---|---|
| 1500 | 16.34 | BN | Nitrogen |
| 1600 | 16.52 | BN | Nitrogen |
| 1700 | 16.73 | BN | Nitrogen |

All of the resulting silica glass specimens permitted a light of 0.16–4.8 μm in wavelength to pass therethrough substantially in the same transmittance as that of usual silica glass.

EXAMPLE 6

A cubic silica glass block of 200 mm in each side was placed in the cavity of a carbon crucible for HIP as shown in FIG. 2 with $Si_3N_4$ powder of 0.1–0.5 mm in particle size surrounding the glass block. The HIP treatment was conducted under various temperature and pressure conditions for 1 hour. Incidentally, temperature increase an decrease in HIP were at a rate of 200° C./hr. Each of the resulting silica glass was heat-treated at 1150° C. for 1 hour in the atmosphere. Hardness was measured on each silica glass by a Vickers hardness tester under a load of 25 g. The results are shown in Table 7.

TABLE 7

| Temp. (°C.) | Pressure (MPa) | Hardness (GPa) | Powder | Atmosphere |
|---|---|---|---|---|
| 1500 | 120 | 16.60 | $Si_3N_4$ | Nitrogen |
| " | 180 | 16.68 | $Si_3N_4$ | Nitrogen |
| 1700 | 120 | 16.73 | $SI_3N_4$ | Nitrogen |
| " | 180 | 16.82 | $Si_3N_4$ | Nitrogen |
| 1900 | 120 | 17.04 | $Si_3N_4$ | Nitrogen |
| " | 180 | 17.23 | $Si_3N_4$ | Nitrogen |

All of the resulting silica glass specimens permitted a light of 0.16–4.8 μm in wavelength to pass therethrough substantially in the same transmittance as that of usual silica glass.

As explained above, by forming silica glass substantially in the shape of a final product, surrounding it with at least one kind of powder selected from carbon powder and nitride powder made of silicon nitride or boron nitride and treating it in an atmosphere of an inert gas or a nitrogen gas at a temperature of 1400°–2500° C. and pressure of 10–300 MPa, high-hardness silica glass having excellent transmittancy can easily be obtained for a short period of time while retaining its initial shape.

What is claimed is:

1. A method of producing high-hardness, transparent optical silica glass having a Vickers hardness of 12–20 GPa, comprising surrounding an integral silica glass block with a powder selected from the group consisting of carbon powder and nitride powder, and compressing said integral silica glass block surrounded by said powder at a temperature of 1400°–2500° C. and a pressure of 10–300 MPa in an atmosphere of an inert gas or a nitrogen gas, and wherein when the carbon powder sourrounds the block of silica glass the atmosphere is of the nitrogen gas, the compressing being carried out such that nitrogen is thereby added to the structure of the glass block to increase the hardness of the glass, and removing the glass from the powder to provide said high hardness transparent optical silica glass having said Vickers hardness.

2. The method according to claim 1, wherein said powder is carbon powder.

3. The method according to claim 1, wherein said powder is silicon nitride powder.

4. The method according to claim 1, wherein said powder is boron nitride powder.

5. The method according to claim 1, wherein said powder has a particle size of 50 $\mu$m–5 mm.

6. The method according to claim 1, wherein the temperature is 1500°–2000° C. and the pressure is 150–200 MPa.

7. The method according to claim 1, wherein said atmosphere is a nitrogen gas.

8. The method according to claim 7, wherein said powder is silicon nitride powder.

9. The method of producing high-hardness silica glass according to claim 7, wherein said nitride powder is made of silicon nitride or boron nitride.

10. The method of producing high-hardness silica glass according to claim 7, wherein said inert gas is selected from noble gases.

11. The method of producing high-hardness silica glass according to claim 1, wherein said compressing is hot-pressing or hot isostatic-pressing.

* * * * *